United States Patent Office 2,915,301
Patented Dec. 1, 1959

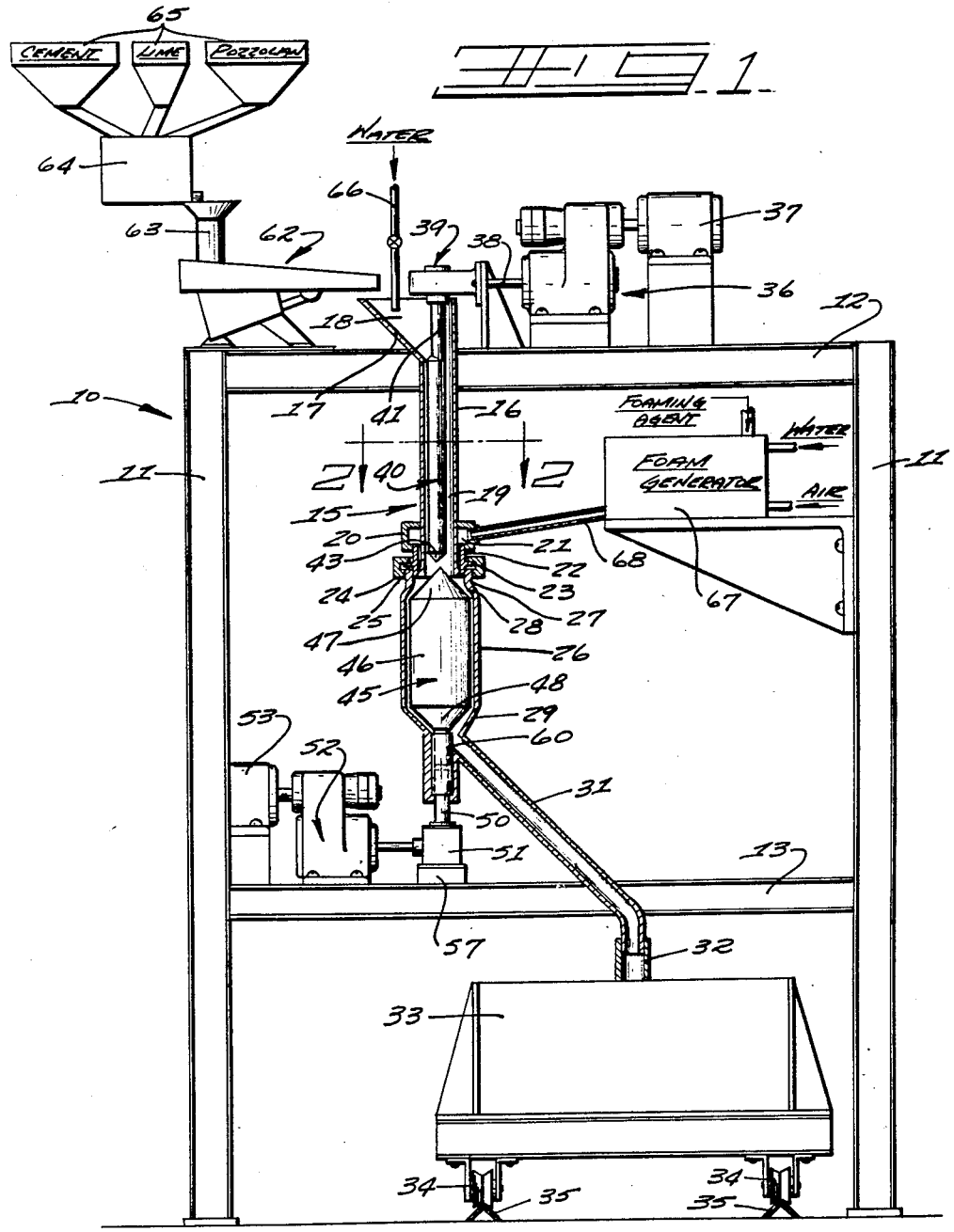

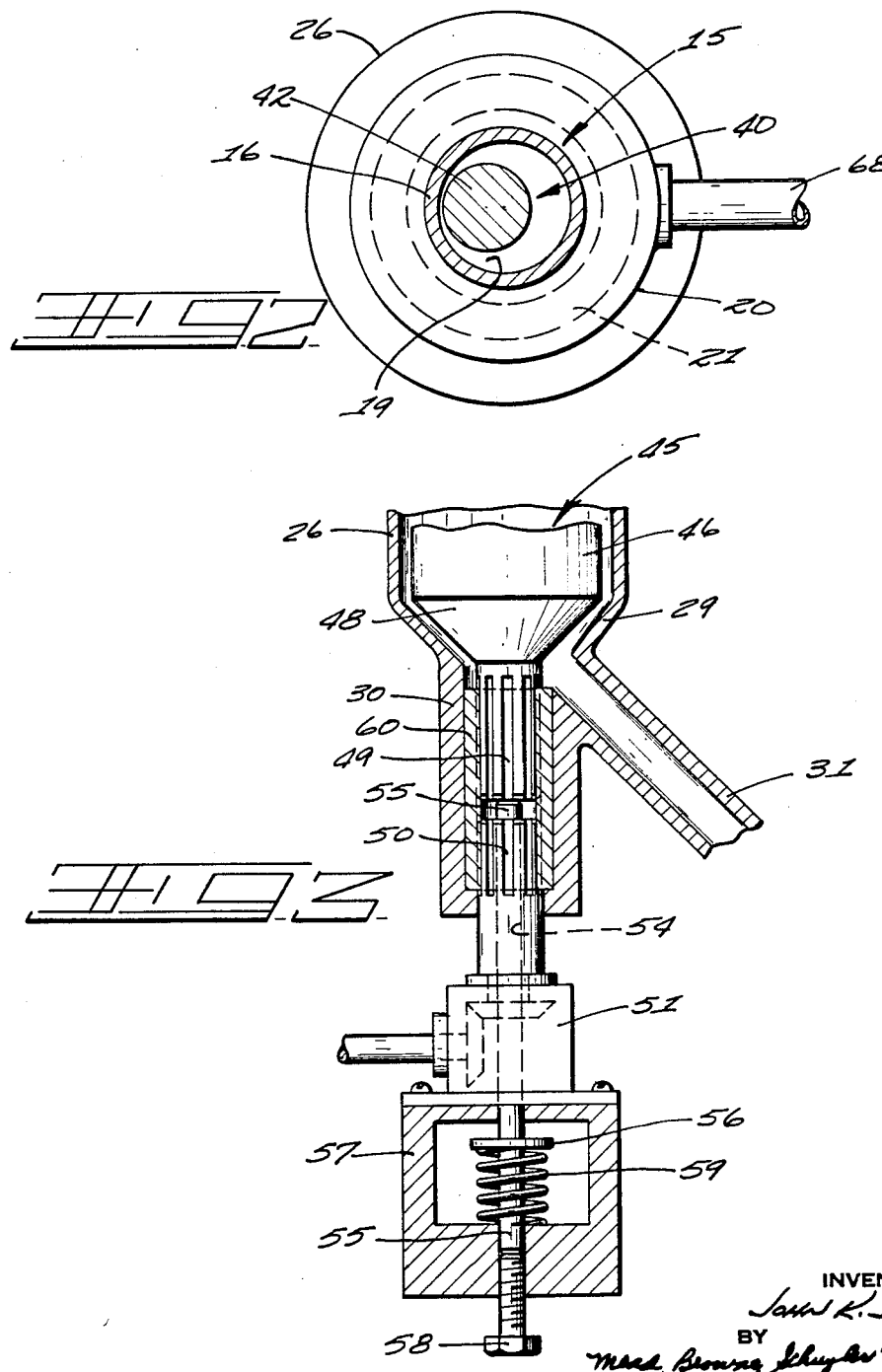

2,915,301
FOAMED SLURRY GENERATOR
John K. Selden, Buffalo, N.Y.

Application December 11, 1957, Serial No. 702,193

11 Claims. (Cl. 259—147)

The present invention relates to a slurry generator and to a method of generating a slurry. More particularly, this invention relates to a generator and method of forming and blending of a slurry of the type utilized in the manufacture of cellular concrete.

The manufacture of cellular concrete by methods now in use involves the mixing of materials in large vessels to form a slurry containing cement, silica, and quicklime together with a foaming agent. The materials are mixed into a slurry by the use of more or less conventional batch mixing apparatus, and the materials are then introduced into a mold for reaction through a relatively long holding time. Because of the holding time necessary, economic production has required the mixing of large batches, requiring large mixing apparatus in which the slurry must be mixed for an extended period of time. Accordingly, shutdown time has constituted a large portion of the production cycle because of the necessity of removing built up slurry deposits in the mixing equipment. Additionally, the present process suffers from all of the economic disadvantages of any batch-mixing process.

The present invention now provides a new and improved generator and method particularly adapted for the formation of cellular concrete slurries by a continuous process. The apparatus of the present invention thus includes continuous mixing and dispersing means for forming the foamed slurry, the apparatus being self-cleaning to reduce the shutdown time of the apparatus and being adjustable to vary the conditions of slurry generation, when necessary or desired.

More specifically, the apparatus of the present invention includes an elongated cylindrical mixing chamber into which the dry cementitious materials and water are introduced for mixing between the walls of the chamber and an eccentric cylindrical rotor. Rotation of the eccentric rotor will form a pre-slurry mixture of the cementitious materials and water. Next, the pre-generated foam is introduced into the pre-slurry at the exit end of the pre-slurry mixing chamber. The pre-slurry and foam are then thoroughly mixed between concentrically disposed, relatively rotatable elements to form the finished slurry. The finished slurry can then be introduced into a mold in which it is hardened to form the cellular concrete product.

In order to facilitate the formation of the final slurry under the conditions desired, the concentrically rotatable elements are relatively movable to provide an adjustable jet orifice through which the pre-formed slurry and foam are forced, this annular jet orifice effecting the initial mixing of the slurry and the foam-forming ingredients and provides a means for readily varying the energy of sheer expended on the liquid independently of the speed of rotation.

The method of this invention contemplates the formation of an aqueous, foamed slurry by the introduction of dry cementitious ingredients and water into an elongated mixing chamber, mixing the ingredients and water between the walls of the chamber and a relatively rotatable eccentric rotor, continuously discharging the mixed ingredients and water from said chamber and mixing therewith a preformed aqueous foam, and further mixing the ingredients, water and foam.

It is, therefore, an important object of the present invention to provide an improved slurry generator which is continuously operable and which eliminates the economic difficulties inherent in the batch mixing of slurries.

Another important object of the present invention is the provision of a continuously operable slurry generator particularly adapted for the formation of a cementitious aqueous slurry and for continuously incorporating into the slurry foaming ingredients.

It is still another object of this invention to provide an improved method of generating a foamed cement slurry by the mixing of dry cementitious material and water followed by the continuous introduction of foaming ingredients thereinto.

Yet another important object is the provision of a slurry generator wherein a pair of relatively rotatable eccentric elements are utilized to form an aqueous slurry containing cementitious ingredients, the slurry being continuously mixed with a foaming agent and introduced through an adjustable orifice for varying the energy of sheer expended on the liquid and for thoroughly disbursing the foaming agent in the cementitious slurry, followed by the additional mixing of the ingredients in the annular space provided by a pair of rotatable cylindrical elements.

Still another object of this invention is the provision of an improved foam slurry generator wherein an aqueous cementitious slurry has injected thereinto a foam forming ingredient, the mixture being thoroughly mixed after passage through an adjustable orifice.

Further objects and advantages of the invention will become apparent from the following description taken in conjunction with the accompanying drawings, in which:

Figure 1 is a somewhat schematic illustration of an apparatus of the present invention;

Figure 2 is an enlarged sectional view taken along the plane 2—2 of Figure 1; and Figure 3 is an enlarged view of a portion of the apparatus of Figure 1 further illustrating the means for adjusting the injection orifice.

As shown on the drawings:

As viewed in Figure 1 of the drawings, reference numeral 10 refers generally to a supporting base comprising a plurality of spaced vertical support elements 11 and upper horizontal support elements 12 joining the vertical support elements 11 and providing an upper supporting surface. An intermediate supporting surface is provided by transverse support elements 13.

A slurry generator of the present invention is illustrated in Figure 1 as supported upon the elements 11, 12 and 13, the generator being indicated generally by reference numeral 15 and comprising a two-part, vertically disposed outer casing including an upper, elongated tubular casing 16 having a laterally deflected entry lip 17. The upper casing elements 16 and 17 thus define an open topped area 18 adapted for the reception of slurry ingredients and a vertically disposed cylindrical mixing chamber 19.

The lower end of the cylindrical casing 16 is circumscribed by a collar 20 sealingly engaging the outer periphery of the casing 16 and cooperating therewith to define an annular foam introduction chamber 21. The collar 20 is provided with an enlarged diameter cylindrical joining element 22 which carries a lower outturned flange 23 surrounded by a second collar 24 provided with a lower threaded aperture 25 into which is threaded the upper end of a lower, generally cylindrical casing 26. This lower casing 26 is provided with a reduced neck 27 which is exteriorly threaded for reception by the threaded aperture 25, the neck 27 being joined to the main cylindrical portion of the casing 26 by downwardly and outwardly inclined portions 28, for a purpose to be hereinafter more fully described. The lower end of the casing 26 is necked down, as at 29, to define a lower cylindrical bearing portion 30. This bearing portion 30 is apertured at one side to receive a downwardly and laterally inclined ejection chute 31 which communicates at its lower end with the filling fixture 32 of a mold 33. This mold 33 is portable and may desirably be disposed upon wheels 34 movable along laterally spaced tracks 35.

Disposed upon the upper support surface defined by the support elements 12 is a variable speed drive 36 of suitable design adapted to be driven by a suitable source of power, such as a motor 37. The output shaft 38 of the variable speed drive 36 is adapted, as through an angular gear drive 39, to drive an eccentric rotor 40. This rotor 40 is provided with an upper, axially extending portion 41 extensible through the chute portion 18 of the casing 16 and adapted for connection to the variable speed drive 36 and motor 37 through the angle gear set 39. That portion of the rotor 40 projecting into the cylindrical casing portion 16 and indicated by reference numeral 42 is eccentric with respect to the axial portion 41 thereof. The eccentric portion 42 is of such contour and size that it is readily received by the cylindrical casing portion 16, with the rotation of the rotor bringing the radially enlarged cylindrical eccentric portion 42 thereof into proximity to the wall of the casing 16.

It will be noted from Figure 2 that the eccentric portion 42 of the rotor 40 is circular in cross-section and cylindrical in over-all contour, the eccentric portion terminating in a conical lower end 43.

Disposed within the lower cylindrical casing 26 is a generally cylindrical rotor 45, this rotor being concentric with the casing 26 and having a generally cylindrical main body portion 46 and a generally conical upper nose portion 47. The lower end of the concentric rotor 45 is tapered, as at 48, terminating in a depending splined stub-shaft 49 (best shown in Figure 3). The stub-shaft 49 is axially aligned with a vertically upwardly projecting, tubular drive shaft 50 driven by suitable means, such as an angular gear set 51, from a second speed change apparatus 52 driven by a suitable source, as by a motor 53. The vertical drive shaft 50 is splined at its outer periphery and is provided with a central axial bore 54 slidably receiving and axially projecting actuating rod 55, this actuating rod abutting the undersurface of the splined stub-shaft 49 of the concentric rotor 45. The actuating rod 55 depends downwardly through the offset gearset 51, the lower portion of the actuating rod carrying a radially extending peripheral flange 56. A supporting bracket 57 at least partially surrounds the lower extremity of the actuating rod and threadedly receives an upwardly projecting adjusting screw 58. The screw 58 abuts the lower extremity of the actuating rod and serves to adjust the actuating rod vertically. A coiled compression spring 59 is interposed between the bracket 57 and the flange 56, the spring serving to urge the actuating rod upwardly to maintain the upper extremity thereof in contact with the extreme axial end of the stub-shaft 49.

Peripherally enclosing the splined stub-shaft 49 and the splined upper end of the shaft 50 is an internally splined drive sleeve 60, this drive sleeve being journaled by the journal extension 30 of the casing 26.

The operation of this portion of the apparatus will be obvious, since actuation of the motor 53 will drive the gearset 51 through the speed changer 52 and the vertically extending shaft 50. The shaft 50 is connected to the stub-shaft 49 through the splines thereof and the spline sleeve 60, to drive the concentric rotor 45 about its vertical axis. The rotor 45 can be adjusted vertically by virtue of the setscrew 58 and the adjustment rod 55. The compression spring 59 maintains the rod in contact with the stub-shaft 49, the weight of the rotor urging the stub-shaft 49 downwardly into contact with the adjustment rod 55.

The adjustment of the screw 58 and of the adjusting rod 55 will vary the orifice provided by the conical upper end 47 of the rotor 45 and the interior inclined surfaces 28 of the casing 26, for purposes to be hereinafter more fully described.

It will be appreciated that the device of the present invention is capable of wide use for the formation of slurries, emulsions, aqueous and non-aqueous suspensions, solutions and the like. However, the device is particularly adapted for the formation of cellular hydrosilicate slurries, particularly such slurries as are utilizable for the formation of cellular concrete. To adapt the machine to this particular use, the upper support surface defined by the elements 12 carries a dry mix feeder indicated generally at 62 and preferably of the helical screw feed type. This feeder receives ingredients through a vertically extending feed funnel 63 which in turn receives ingredients from a continuous proportioning unit 64. Such units are well known in the art and are adapted to continuously and properly proportion ingredients introduced thereinto. In the particular embodiment of Figure 1, a plurality of hoppers are superimposed over the continuous proportioning device 64, and such hoppers 65 may desirably contain cement, lime, and pozzolan ingredients. The cement is preferably of the Portland-type, either normal or of the high early strength type. The lime is preferably quicklime, although a high calcium hydrate may be utilized, particularly if a pre-heating step is utilized.

Any desired pozzolanic material may be utilized, a pozzolan being defined as a finely divided material rich in silica or alumina which, while not necessarily cementitious in itself, will react at ordinary temperatures with hydrated lime in the presence of water deformed insoluble cementitious products. A preferred pozzolan is silica flour, although ground silica sand, burned oil-shale, fly-ash, ground, brick or tile, volcanic ash, granulated slag, diatomaceous earth, pumice dust, glass polishing waste or other suitable pozzolans may be utilized.

The dry ingredients form the dry mix feeder 62 and are fed into the hopper portion 18 of the casing 16 for mixture with water introduced by suitable means, as through a conduit 66. The dry ingredients and water are mixed by rotation of the eccentric rotor 40 in the casing 16 to form a cementitious slurry. The rotation of the eccentric element 40 will continuously clean the interior surfaces of the rotor and of the casing 16, and will aid in thoroughly dispersing the liquid phase and the solid phase of the slurry.

The slurry will have been substantially formed by the time of its arrival at the exit end of the casing 16, at which time a pre-formed foam for foaming ingredients are introduced into the cementitious slurry. A foaming agent of the following types may be used:

Detergents, resin soap, saponin, alkylated naphthalene sulfonates, neutralized synthetic resins or hydrolyzed proteins, such as keratine, casein, or commercial foam liquids can be utilized as foaming agents.

As indicated in Figure 1, the foaming ingredients are preferably introduced into a foam generator indicated schematically at 67, the generated foam being conducted through a conduit 68 into the annular chamber 21 defined by the collar 20. These foaming ingredients are next introduced vertically and coaxially with respect to the casing 16 into the lower casing 26. Actually, the entry of the foam and the cementitious slurry into the casing 26 is coaxial, and this introduction takes place in the immediate vicinity of the nozzle orifice defined by the conical upper end of the concentric rotor 45 and the casing portions 28. The cementitious slurry and the preformed foam are forced to travel circumferentially of the concentric rotor 45 and intermediate the periphery of the rotor 45 and the casing 26, the completely formed foamed slurry being ejected from the casing 26 through a downwardly and laterally inclined conduit 31 into the mold 33 for setting and final curing.

The adjustability of the nozzle defined by the conical upper end 47 of the concentric rotor 45 and the casing portion 28, as by the adjustment screw 58, makes possible a variation of the cross-sectional area of the orifice. Further, variations in this cross-sectional area vary the energy of sheer expended on the liquid for a given speed of rotation, the adjustment being possible independently of the speed of rotation. When the variability of adjustment of orifice size is compounded with the variations in the rotational speed of the rotor 45, it will be appreciated that a very flexible apparatus is provided which is capable of forming a foam having the desired characteristics under almost any operating conditions.

In order that the process involved in the utilization of the apparatus of the present invention may be better understood, the following example is submitted.

The cementitious slurry formed in the upper casing 16 by rotation of the eccentric rotor 40 is of the following composition:

|   | Percent |
|---|---|
| High early cement | 28.6 |
| Silica flour | 66.5 |
| Quicklime | 4.9 |
|   | 100.0 |

Calcium chloride was added as an accelerator to an extent equal to 2% by weight of the cement in the slurry dry ingredients.

The dry ingredients were mixed with an amount of water sufficient to yield a water-to-solids ratio of 0.75 by weight and to yield a cementitious slurry having a wet density of 46 lbs. per cubic foot. A commercial foaming agent sold under the trade name "National Foam Liquid," and consisting of a 3% solution of the foaming agent in water and sufficient air to form a consistent air stable foam was utilized to an extent consisting of 0.016 gallon of foaming agent per 100 lbs. of slurry.

In a series of pilot plant runs, the density at the mold averaged 47.6 lbs. per cubic foot. The slurry was then pre-cured for 8 hours at 100° F. and finally autoclaved at a temperature of 150 lbs. per square inch for a period of ten hours. The finished product had an average density of 31.2 lbs. per cubic foot.

The many advantages of applicant's apparatus and process will be readily evident to those skilled in the art.

Primarily, the present apparatus eliminates the heretofore necessary and inherently time consuming batch-type operation which involves the mixing of tons of materials in large vessels with long holding tines. Secondly, there is no accumulation of air hardened slurry on the mixing apparatus, in the mixing tanks, or in any other portions of the apparatus inasmuch as the slurry is formed by operation of the eccentric rotor which is self-purging and self-cleaning.

The generating apparatus and method involves the continuous co-axial jet injection of the thoroughly pre-mixed and homogenized cementitious slurry into a stream of preformed, tenacious foam under controlled conditions. This simultaneous and continuous injection through the variable orifice defined by the casing results in the dispersion of each of the slurry ingredients in the other with a minimum of foam breakdown and with the complete elimination of entrained, undesired, extraneous air bubbles.

What I claim as my invention is:

1. A slurry generator comprising an elongated mixing chamber, a rotor eccentric in said chamber, means for rotating said rotor, means for introducing dry slurry-forming ingredients and liquid slurry-forming ingredients into said chamber, an outlet orifice for said chamber adapted to receive a cementitious slurry therefrom, and means including an annular passage concentrically surrounding said orifice for introducing a preformed foam into the cementitious slurry as it issues from said orifice.

2. An apparatus for forming a foamed cementitious slurry comprising superimposed mixing chambers, rotor means disposed in said chambers, respectively, means defining an orifice intermediate said chambers, means for introducing dry and liquid slurry ingredients into the upper of said chambers, and means for introducing a preformed foam intermediate said chambers for admixture with said slurry as it issues from said orifice, said last mentioned means comprising an annular passage concentric with said orifice and communicating therewith.

3. An apparatus for forming a cementitious foamed slurry comprising a first cylindrical chamber adapted to receive slurry-forming ingredients, means disposed in the chamber for agitating said ingredients, a second cylindrical chamber axially aligned with the first chamber, means in said second chamber for agitating the slurry introduced thereinto from said first chamber, means defining an orifice through which a slurry is passed from the first chamber to the second chamber, and means concentric with said orifice for introducing a preformed foam into said slurry as the slurry passes through the orifice.

4. The method of forming an aqueous foamed slurry comprising mixing dry cementitious ingredients and water in a mixing chamber to form an aqueous slurry, ejecting the aqueous slurry from the chamber through an orifice, and introducing a preformed foam into the ejected aqueous slurry immediately as it is ejected through said orifice.

5. The method of continuously forming a foamed slurry comprising the steps of mixing dry and liquid slurry ingredients, passing the mixed ingredients through a reduced orifice and mixing a preformed foam with the previously mixed ingredients at the orifice as the slurry issues from said orifice.

6. A slurry generator comprising a mixing chamber, rotary mixing means in said chamber, means for rotating said mixing means, means for introducing slurry-forming ingredients into said chamber, an outlet orifice for said chamber and means defining an annular inlet passage concentric with said orifice for introducing foaming ingredients into the cementitious slurry as it issues from said orifice.

7. An apparatus for forming a foamed cementitious slurry comprising superimposed mixing chambers, rotor means disposed in said chambers, respectively, means defining an orifice intermediate said chambers, an inlet chamber surrounding said orifice, means for introducing slurry ingredients into the upper of said chambers, and means for introducing a preformed foam into said inlet chamber for admixture with said slurry as it issues from said orifice.

8. An apparatus for forming a cementitious foamed slurry comprising a first cylindrical chamber adapted to receive slurry-forming ingredients, means disposed in the chamber for agitating said ingredients, a second cylindrical chamber axially aligned with the first chamber, means defining an orifice intermediate said chambers and concentric therewith through which a slurry is passed from the first chamber to the second chamber, means for adjusting the size of said orifice, and means for introducing a preformed foam into said slurry as the slurry passes through the adjustable orifice.

9. In a method of forming an aqueous foamed slurry, the steps of forming an aqueous slurry, passing the aqueous slurry through an orifice and introducing a preformed foam into the aqueous slurry at the orifice as said slurry passes therethrough.

10. In an apparatus for forming a foamed cementitious slurry comprising superimposed mixing chambers the upper of which is adapted to receive cementitious slurry ingredients, means defining an annular orifice intermediate said chambers, and annular nozzle means concentric with said annular orifice for introducing a preformed foam intermediate said chambers for admixture with said slurry as it issues from said orifice.

11. In an apparatus for forming an aqueous foamed slurry, upper and lower axially aligned mixing chambers communicating with one another through a passage, said upper chamber being adapted for the introduction of slurry ingredients, rotatable agitating means disposed eccentrically in the upper of said chambers and terminating short of said passage, separate rotatable agitating means disposed concentrically in said lower of said chambers and having a conical end portion projecting into said passage to define therewith an annular orifice between said chambers, means for rotating said agitating means, and an annular inlet concentric with said orifice for the introduction of a foaming agent for admixture with ingredients passing through said orifice.

References Cited in the file of this patent

UNITED STATES PATENTS

| | | |
|---|---|---|
| 304,615 | Church | Sept. 2, 1884 |
| 1,731,953 | Thomson | Oct. 15, 1929 |
| 1,733,018 | Hinton | Oct. 22, 1929 |
| 1,753,255 | Thomson | Apr. 8, 1930 |
| 1,776,325 | Robinson et al. | Sept. 23, 1930 |
| 1,829,714 | McElroy | Oct. 27, 1931 |
| 2,114,275 | Murphy et al. | Apr. 12, 1938 |
| 2,337,915 | Menger et al. | Dec. 28, 1943 |
| 2,448,042 | Miller | Aug. 3, 1948 |
| 2,706,108 | Miner | Apr. 12, 1955 |
| 2,864,714 | Dixon et al. | Dec. 16, 1958 |